United States Patent

Zennyoji

[11] Patent Number: 5,539,987
[45] Date of Patent: Jul. 30, 1996

[54] X-Y CARRIAGE MOVING SYSTEM

[75] Inventor: Mamoru Zennyoji, Tochigi-ken, Japan

[73] Assignee: Mitsuba Electric Mfg. Co., Ltd., Gunma-ken, Japan

[21] Appl. No.: 456,448

[22] Filed: Jun. 1, 1995

[30] Foreign Application Priority Data

Jun. 8, 1994 [JP] Japan .................... 6-151465

[51] Int. Cl.⁶ .................... F16H 19/06; G01D 15/24
[52] U.S. Cl. .................... 33/1 M; 74/89.22; 346/139 B
[58] Field of Search .................... 33/1 M, 18.1; 74/89.22; 346/139 A, 139 B

[56] References Cited

U.S. PATENT DOCUMENTS

| | | | |
|---|---|---|---|
| 3,611,819 | 10/1971 | Muller et al. | 33/1 M |
| 3,881,369 | 5/1975 | Looney | 74/89.22 |
| 4,275,395 | 6/1981 | Dewey et al. | 33/1 M |
| 5,134,779 | 8/1992 | Sprenger et al. | 33/1 M |

FOREIGN PATENT DOCUMENTS

| | | | |
|---|---|---|---|
| 2274719 | 8/1994 | United Kingdom | 74/89.22 |

*Primary Examiner*—Christopher W. Fulton
*Attorney, Agent, or Firm*—Skjerven, Morrill, MacPherson, Franklin & Friel; Thomas S. MacDonald

[57] ABSTRACT

A bracket having an arm extending therefrom is securely attached, at a base end thereof, to a first belt passed around a pair of pulleys, and a second belt is passed around another pair of pulleys and guided along the length of the arm by rollers or the like. A carriage is securely attached to a part of the second belt extending along the length of the arm. Therefore, by moving the first belt, the arm is moved along the length of the first belt or in the X-direction. By moving the second belt while keeping the first belt stationary, the carriage is moved along the length of the arm or in the Y-direction. Thus, the carriage can be moved to an arbitrary point along a desired path in a X-Y coordinate system by individually moving the first and second belts in an appropriate manner. Since the actuators such as electric motors for actuating the belts for effecting the movement of the carriage can be secured to a stationary base, the mass of the moveable parts can be reduced with the result that the response speed of the system can be increased, and the load on the guide system for the various moveable parts can be reduced.

7 Claims, 2 Drawing Sheets

5,539,987

X-Y CARRIAGE MOVING SYSTEM

TECHNICAL FIELD

The present invention relates to a X-Y carriage moving system for moving a carriage to a desired location in a X-Y coordinate system which is suitable for use in robot arms, X-Y plotters and other devices which are adapted to position a carriage at a desired point in a X-Y coordinate system.

BACKGROUND OF THE INVENTION

X-Y carriage moving systems are widely used in robot arms for moving a work from one location to another, in X-Y plotters for moving a pen along a prescribed path to draw various drawings on a sheet of paper or the like, and in cutting tools for moving a cutting tool along a prescribed path to cut out a plate or sheet member into a desired shape. In such a system, typically, the working end, such as a robot finger, a pen and a cutting tool, is carried by a carriage guided by a Y-axis guide and driven in the Y-direction by a Y-axis drive motor. The Y-axis guide and the Y-axis drive motor are carded by a Y-axis unit which is in turn supported by a X-axis guide and driven in the X-direction by a X-axis drive motor. By appropriately actuating the X- and Y-axis drive motors, it is possible to move the working end to a desired location in a X-Y coordinate system. However, according to a typical conventional system, the Y-axis unit travels along the X-axis guide, and the relatively large mass or the inertia of the Y-axis drive motor incorporated in the Y-axis unit and the presence of power cables for the Y-axis drive motor have been known to be major problems. The relatively large mass of the Y-axis unit correspondingly requires a relatively rigid guide structure, and it is detrimental to the reduction in the cost and the size of the system. More importantly, the inertia of the Y-axis unit is highly disadvantageous in increasing the response speed of the working end. Also, the presence of the power cables is a problem because it requires some arrangement to keep the power cables from interfering with the movement of the system, and the cables adds to the mass of the Y-axis unit.

BRIEF SUMMARY OF THE INVENTION

In view of such problems of the prior art, a primary object of the present invention is to provide a X-Y carriage moving system having an improved response property through reduction in the mass of the moving parts.

A second object of the present invention is to provide a X-Y carrriage moving system which is free from the problems associated with the power cables by fixing the positions of the electric motors for actuating the X-Y carriage moving system.

A third object of the present invention is to provide a X-Y carriage moving system which can reduce the load acting on the guide means for the carriage through reduction in the mass of the moving parts.

According to the present invention such objects can be accomplished by providing a X-Y carriage moving system, comprising: first and second pulley means rotatably supported by first and second shafts, respectively; third and fourth pulley means rotatably supported by the first and second shafts, respectively; first belt means passed around the first and second pulley means; arm means having a base end fixedly secured to the first belt means and a free end extending away from the first belt means; belt guide means provided in the arm means; second belt means passed around the third and fourth pulley means and guided by the belt guide means along the arm means; a carriage fixedly secured to a part of the second belt means extending along the arm means; and power means for individually moving the first and second belt means.

Thus, by moving the first belt means, the arm means is moved along the length of the first belt means or in the X-direction. By moving the second belt means while keeping the first belt means stationary, the carriage is moved along the length of the arm means or in the Y-direction. Thus, the carriage can be moved to an arbitrary point in a X-Y coordinate system by individually moving the first and second belt means in an appropriate manner. The movements of the first and second belt means can be effected either sequentially or simultaneously. By properly synchronizing the movements of the first and second belt means, it is possible to trace an arbitrary path with the carriage.

According to a preferred embodiment of the present invention, the arm means comprises a bracket fixedly secured to the first belt means and including an arm integrally extending therefrom, and the belt guide means comprises a pair of guide rollers provided in a base end of the arm, and a third guide roller provided in free end of the arm. In any case, the second belt means is guided by the belt guide means so as to be passed along the length of the arm. The arm typically extends in the Y-direction while the first belt means, at least the section carrying the arm means extends in the X-direction. Typically, the X- and Y-directions are perpendicular to each other, but they may form an angle not equal to 90 degrees if desired.

To reduce the possibility of slipping between the belt means and the pulley means, the first and second belt means may consist of cogged belts while the pulley means consist of cogged wheels adapted for the cogged belts. For compact design of the power means, the power means comprises a pair of driven pulleys fixedly and coaxially secured to the second and fourth pulley means, respectively, a pair of electric motors, drive pulley means mounted on output shafts of the electric motors, respectively, and a pair of belt means each passed around one of the drive pulley means and an associated one of the driven pulley means. Preferably, the electric motors are arranged in a coaxial relationship.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
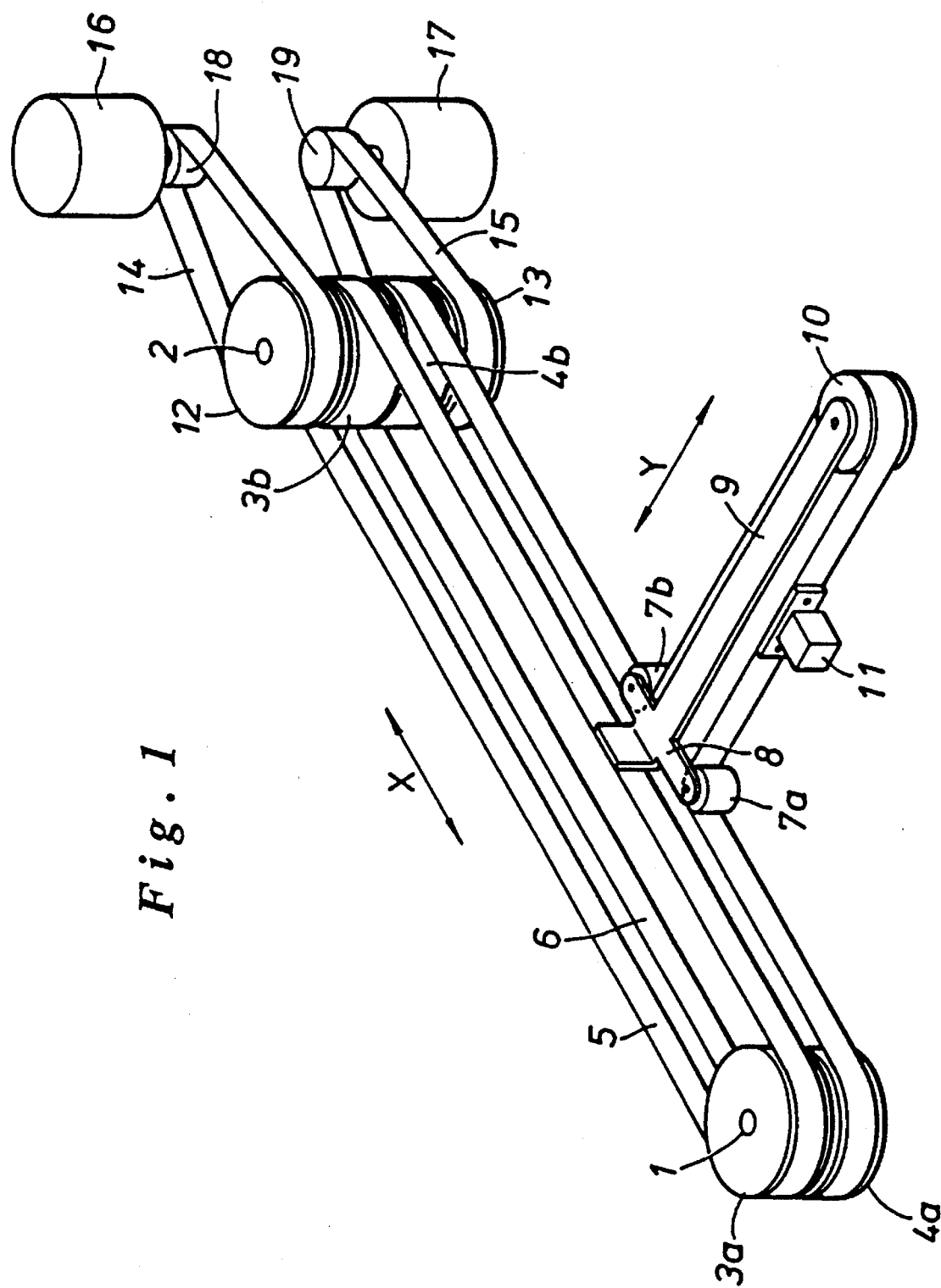
FIG. 1 is a perspective view showing an embodiment of the X-Y carriage moving system according to the present invention.

FIG. 1 is a simplified view of an embodiment of the X-Y carriage moving system according to the present invention. This X-Y carriage moving system comprises a pair of fixed shafts 1 and 2 which are formed on a table not shown in the drawing. A pair of cogged pulleys 3a and 4a are each independently rotatably mounted on one of the shafts 1, and another pair of cogged pulleys 3b, 4b are likewise mounted on the other shaft 2. A first cogged belt 5 is passed around the pulleys 3a and 3b, and a second cogged belt 6 is passed around the pulleys 4a and 4b.

A bracket 8 is fixedly secured to an outer surface of the first cogged belt 5 at a base portion thereof so as to jointly travel with this cogged belt 5. Preferably, the bracket 8 is guided so as to jointly move with the cogged belt 5 in a stable manner although it is not shown in the drawing. The bracket 8 is integrally provided with an arm 9 extending away from the cogged belt 5, a pair of guide rollers 7a and 7b provided at a base portion of the arm 9, and a guide roller 10 mounted on a free end of the arm 9. In the illustrated embodiment, the shafts 1 and 2, and the guide rollers 7a, 7b and 10 are provided with axial lines which are disposed substantially parallel with each other. The second cogged belt 6 is passed around the guide rollers 7a, 7b and 10, and therefore extends along the length of the arm 9 on either side thereof. A carriage 11 which serves as a working end for carrying a robot finger, a plotter pen or the like is fixedly secured to a part of the second cogged belt 6 located between two of the guide rollers 7a and 10 or 7b and 10.

The cogged pulleys 3b and 4b rotatably supported by the second shaft 2 are each securely attached to a corresponding cogged driven pulley 12 or 13 in a coaxial and integral relationship. A pair of electric motors 16 and 17 are provided adjacent to the second shaft 2, and a cogged drive pulley 18 or 19 is mounted on the output shaft of each of the electric motors 16 and 17. A cogged belt 14 is passed around the drive pulley 18 associated with the electric motor 16 and the driven pulley 12, and another cogged belt 15 is passed around the drive pulley 19 associated with the other electric motor 16 and the cogged driven pulley 13. Thus, the pulley 3b can be rotatively driven by the electric motor 16 via the cogged belt 14 and the cogged pulleys 12 and 18, and the pulley 4b can be rotatively driven by the electric motor 17 via the cogged belt 15 and the cogged pulleys 13 and 19. In this embodiment, the two electric motors 16 and 17 are coaxially arranged one over the other, and it is thus possible to arrange the wiring for these electric motors 16 and 17 jointly and neatly.

Now the operation of this embodiment is described in the following. When the first electric motor 16 is actuated, the first cogged belt 5 is driven along its length, and the bracket 8, along with the guide rollers 7a, 7b and 10 carded thereby, is driven along the length of the belt 5 or in the X-direction. When the second electric motor 17 is actuated while the first electric motor 16 is kept stationary, the second cogged belt 6 is driven along its length, and the carriage 11 is driven along the length of the belt 6 or in the Y-direction because the section of the belt 6 carrying the carriage 11 extends along the length of the arm 9 of the bracket 8. Thus, it is possible to move the carriage in both the X- and Y-directions either by individually actuating the two electric motors 16 and 17 either sequentially or simultaneously. In the latter case, by appropriately synchronizing the rotations of the two electric motors 16 and 17, it is possible to move the carriage 11 along a desired path.

Figure 2:
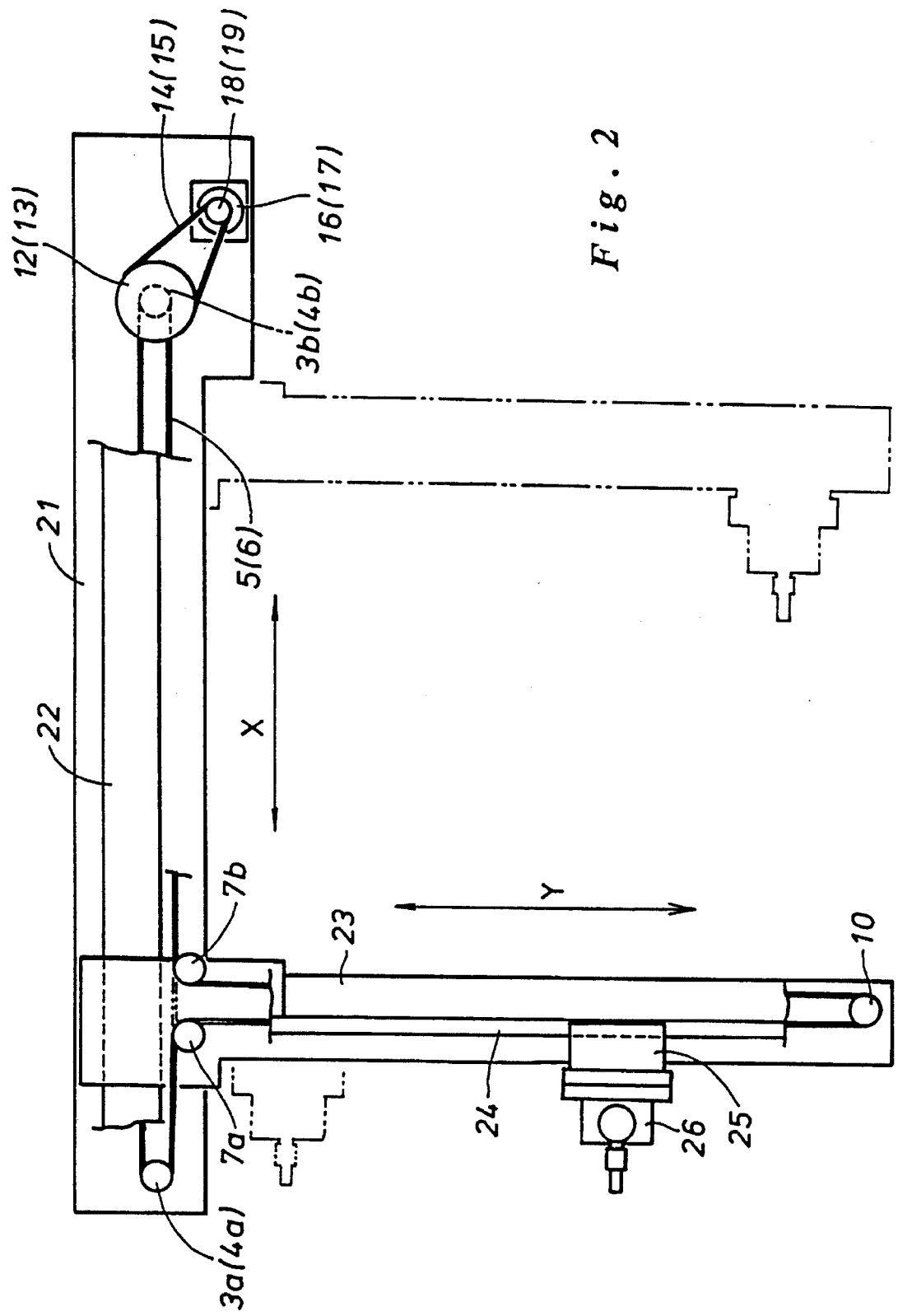
FIG. 2 is a plan view of a slightly different embodiment of the X-Y carriage moving system according to the present invention.

FIG. 2 shows a more concrete embodiment of the present invention. In this embodiment, the X-Y carriage moving system comprises a fixed bar 21 which, for instance, is fixedly secured to a table, a moveable bar 23 slidably engaged, at one axial end thereof, by a X-axis rail 22 extending axially along the length of the fixed bar 21, a carriage 25 slidably engaged by a Y-axis guide rail 24 extending axially along the length of the moveable bar 23, and a robot finger 26 fixedly secured to the carriage 25. A pair of cogged pulleys 3b and 4b, a pair of driven pulleys 12 and 13 securely and coaxially attached to the cogged pulleys 3b and 4b, respectively, and electric motors 16 and 17 are provided in one axial end of the fixed bar 21, and a pair of cogged pulleys 3a and 4a are provided in the other axial end of the fixed bar 21. A pair of guide rollers 7a and 7b are provided in a base end of the moveable bar 23, and an intermediate cogged pulley 10 is provided in a free end of the moveable bar 23. As one can readily appreciate, the moveable bar 23 corresponds to the bracket 8 and the arm 9 of the previous embodiment, and the carriage 25 and the robot finger 26 correspond to the carriage 11 of the previous embodiment.

In this embodiment, the moveable bar 23 was guided by only one end thereof, but it is also possible to guide two axial ends of the moveable bar 23 so as to increase the rigidity and stability of the guide system for the moveable bar 23.

Thus, according to the present invention, because the power means such as an electric motor for moving the carriage in the Y-direction as well as the power means for moving the carriage in the X-direction can be fixed, and the mass of the moveable parts can be thereby significantly reduced. This in turn improves the response of the X-Y carriage moving system, and allows the simplification of the guide system for guiding the movement of the carriage in the X- and Y-directions.

In the above described embodiment, cogged belts were used, but other belt means can also be used. For instance, wire and sheave combinations, roller chain and sprocket combinations, and other equivalent combinations can be used. Also, a pair of individually controlled motors were used in the above described embodiments, but it is also possible to use a single motor and move the two belt means sequentially and individually by using clutches and other power control arrangements. In this case, the electric arrangement for the motor can be substantially simplified.

Although the present invention has been described in terms of concrete embodiments, it is obvious for a person skilled in the art that it is possible to alter and modify the embodiments without departing from the spirit of the invention. The embodiments are thus for illustrative purpose only, and the scope of the present invention should be determined solely from the appended claims.

What we claim is:

1. A X-Y carriage moving system, comprising:

first and second pulley means rotatably supported by first and second shafts, respectively;

third and fourth pulley means rotatably supported by said first and second shafts, respectively;

first belt means passed around said first and second pulley means;

arm means having a base end fixedly secured to said first belt means and a free end extending away from said first belt means;

belt guide means provided in said arm means;

second belt means passed around said third and fourth pulley means and guided by said belt guide means along said arm means;

a carriage fixedly secured to a part of said second belt means extending along said arm means; and power means for individually moving said first and second belt means.

2. A X-Y carriage moving system according to claim 1, wherein said arm means comprises a bracket fixedly secured to said first belt means and including an arm integrally extending therefrom.

3. A X-Y carriage moving system according to claim 2, wherein said belt guide means comprises a pair of guide rollers provided in a base end of said arm, and a third guide roller provided in free end of said arm.

4. A X-Y carriage moving system according to claim 1, wherein said first and second belt means consist of cogged belts, and said pulley means consist of cogged wheels adapted for said cogged belts.

5. A X-Y carriage moving system according to claim 1, wherein said power means comprises a pair of driven pulleys fixedly and coaxially secured to said second and fourth pulley means, respectively, a pair of electric motors, drive pulley means mounted on output shafts of said electric motors, respectively, and a pair of belt means each passed around one of said drive pulley means and an associated one of said driven pulley means.

6. A X-Y carriage moving system according to claim 5, wherein said electric motors are arranged in a coaxial relationship.

7. A X-Y carriage moving system, comprising:

a fixed bar carrying a first guide rail extending axially along a length of said fixed bar;

a moveable bar having one end slidably engaged by said first guide rail, and carrying a second guide rail extending axially along a length of said moveable bar;

first and second shafts projecting from two axial ends of said fixed bar;

first and second pulley means rotatably supported by said first and second shafts, respectively;

third and fourth pulley means rotatably supported by said first and second shafts, respectively;

first belt means passed around said first and second pulley means;

belt guide means provided in said moveable bar;

second belt means passed around said third and fourth pulley means and guided by said belt guide means along said moveable bar;

a carriage fixedly secured to a part of said second belt means extending along said moveable bar; and power means for individually moving said first and second belt means.

* * * * *